3,332,724
DEVICE FOR POSITIONING ON A MECHANICAL CONVEYOR LIGHT OBJECTS MOVED BY A PNEUMATIC CONVEYOR
Gilles Doucet, Saint-Jean-Vedas, France, assignor to Georges Lesieur & Ses Fils, Societe Anonyme, Paris, France
Filed Apr. 4, 1966, Ser. No. 539,954
Claims priority, application France, Apr. 13, 1965, 13,034, Patent 1,453,860
2 Claims. (Cl. 302—2)

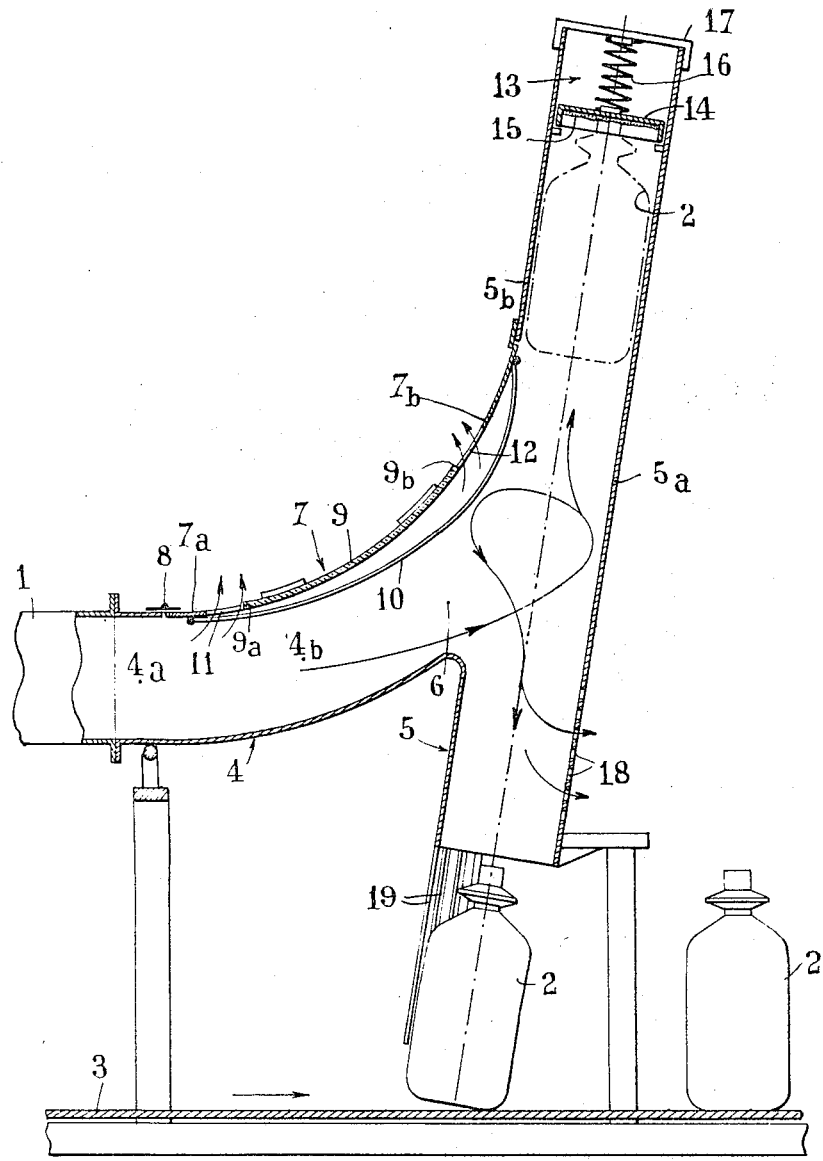

ABSTRACT OF THE DISCLOSURE

Device for positioning, on a mechanical conveyor, light objects, notably bottles of plastic material, moved by a pneumatic conveyor, comprising a curved inlet duct, a substantially vertical outlet duct into which opens, at its upper portion, the inlet duct, this inlet duct having a curved upper wall, said wall consisting partially of a pivoted frame having lower and upper transverse edges at one of its ends and an incurvated longitudinal plate carried by said frame and shorter than the latter so as to delimit, between said plate and the lower and upper edges of the frame, two orifices of adjustable section for the escape of air.

---

The present invention relates to a method of positioning, on a mechanical conveyor, light objects, more particularly bottles of plastic material, moved for example by means of a pneumatic conveyor, characterized in that a curvilinear ascending motion is imparted to each object the object is stopped at the end of its ascending stroke and, subsequently, it is caused to fall onto the mechanical conveyor according to a substantially vertical trajectory.

According to a complementary characteristic of the method of this invention, an air-whirl is formed under the object when the latter is at the end of its ascending stroke, so as to produce under this object a vacuum which reduces the pneumatic ascending force and facilitates the fall of the object onto the mechanical conveyor.

This invention has further for its object to provide a device for positioning, on a mechanical conveyor, light objects, more particularly botles of plastic material, moved by means of a penumatic conveyor, characterized in that it comprises a curved inlet duct connected to the pneumatic supply conveyor in which the light objects are conveyed at high speed, this inlet duct being bent progressively towards the top and opening at its upper portion into a substantially vertical outlet duct, the upper end of said outlet duct forming an abutment for stopping the ascending motion of the objects, and its lower end being located above the mechanical delivery conveyor at a distance superior to the height of the objects being conveyed.

A shock-absorbing device is preferably housed in the upper portion of the outlet duct, in order to progressively retard the ascending movement of the objects which are conveyed at high speed by the pneumatic conveyor.

The method and device according to this invention are advantageous in that they make it possible, by using very simple means, to retard light objects delivered at high speed and to accurately position these objects on a mechanical conveyor.

A typical form of embodiment of this invention will now be described by way of non-limiting example, with reference to the attached drawing which illustrates a diagrammatic vertical section thereof.

In the drawing, there is illustrated the end of the pneumatic conveyor 1 by which the light objects are conveyed at high speed, in the present case bottles of plastic material 2. These bottles 2 must be positioned on a mechanical conveyor 3 to undergo subsequent operations.

The positioning device according to the invention comprises essentially a curved inlet duct 4 and a rectilinear outlet duct 5. The outlet duct 5 is connected tangentially to the inlet duct 4.

The inlet duct 4, which is connected to the pneumatic conveyor 1, comprises a substantially horizontal intake section 4a prolonged by a section 4b progressively incurvated towards the top. The inlet duct 4 opens into the outlet duct 5 through an orifice 6 having a large cross-section.

At the upper portion of the inlet duct 4 there is provided a curved trap-door 7 which is pivotally mounted about a hinge pin 8 on the rectilinear section 4a of the inlet duct 4, this trap-door being connected to the wall 5b of the outlet duct 5. The trap-door 7 consists of a frame carrying a glass plate 9 allowing the observation of the inside of the device. The length of the glass plate 9 is inferior to the distance between the lower element 7a and the upper element 7b of the frame 7, so that between these elements and the lower and upper edges 9a and 9b of the glass plate 9, orifices 11 and 12 respectively are delimited through which air under pressure can escape. The position of the plate 9 on the frame 7 may be so adjusted that the air escaping through the orifices 11 and 12 can be distributed at will.

Secured on the frame 7 are incurvated blades 10 which guide the bottles 2 towards the outlet duct 5.

The outlet duct 5 contains, at its upper end, a shock-absorbing device 13 which consists, in the specific form of embodiment illustrated in the drawing, of a sheet-metal plate 14 folded into a U, having on its lower face a layer 15 of elastic material (for example expanded polystyrene), the plate 14 being urged downwards by a spring 16 bearing on a cross member 17 secured on the upper end of the tube 5.

The wall 5a of the duct 5, which is opposite to the orifice 6 through which the inlet duct 4 is connected to the outlet duct 5, has holes 18 formed at its lower portion for the evacuation of air.

The tube 5 is preferably slightly inclined in relation to the vertical, as shown in the drawing, in such a manner that the bottles 2 move out of the lower end of duct 5 with a slight forward inclination (taking into consideration the direction of their subsequent displacement on the mechanical conveyor 3). In the drawing it will be seen that the conveyor 3 is assumed to move from the left to the right and, therefore, the bottles 2 come out with a slight inclination towards the right. The angle that the axis of the outlet duct 5 makes with the vertical may be for example 10°.

The lower end of the duct 5 may be prolonged, as shown in the drawing, by a series of guide blades 19 distributed in the form of a half-cylinder, in order to assure the guiding of bottles 2 up to the vicinity of the mechanical conveyor 3.

The device according to the invention operates as follows: the bottles 2 made of light material, which are conveyed at high speed by the pneumatic conveyor, are progressively directed upwards by the curved inlet duct 4 and they penetrate into the outlet duct 5 through the orifice 6. The guiding blades 10 assure that the bottles 2 are pressed against the wall 5a of the duct 5 which is opposite to the orifice 6. These bottles 2 continue their ascending movement until they strike against the shock-absorbing device 13. They are then progressively locked in position. At this moment, the driving air which ensures the propulsion of the bottles 2, flows through the orifice 6 and strikes the wall 5a opposite to the duct 5, and it then forms a whirl as indicated by the arrows in the drawing. Then, the air escapes through the holes 18 bored in the wall 5a and through the lower end of the duct 5. The formation of this whirl produces a vacuum under the bottle 2 which has just been braked ond stopped by the shock-absorbing device 13, and this vacuum adds itself to the action of gravity and to that of the spring 16 to cause a rapid downward movement of the bottle 2 into the outlet duct 5. This bottle then falls onto the conveyor 3 on which it is properly positioned.

The adjustment of the position of the incurvated plate 9, that is to say, of the relative sections of the exhaust orifices 11 and 12, makes it possible to act on the efficiency of the air whirl produced under the bottle 2.

Moreover, it is to be understood that the form of embodiment of the invention described hereinabove with reference to the attached drawing has been given by way of non-limiting example only, and that many modifications may be brought thereto without thereby departing from the spirit and scope of the present invention.

What I claim is:

1. Device for positioning, on a mechanical conveyor, light objects, notably bottles of plastic material, moved by a pneumatic conveyor, comprising a curved inlet duct connected to the pneumatic conveyor in which the light objects are conveyed at high speed, this inlet duct being progressively incurvated towards the top, said inlet duct comprises a curved upper wall, said wall consisting partially of a pivoted frame and having lower and upper transverse edges at one of its ends and an incurvated longitudinal plate carried by said frame and shorter than the latter so as to delimit, between said plate and the lower and upper edges of the frame, two orifices of adjustable section for escape of air, a substantially vertical outlet duct into which opens, at its upper portion, the inlet duct, and an abutment formed at the upper end of the outlet duct for stopping the ascending motion of the objects, the lower end of the outlet duct being located above the mechanical conveyor at a distance, which is inferior to the height of the objects being conveyed.

2. Device as set forth in claim 1, comprising at least one curved guide blade carried by the pivoted frame and projecting inside the curved inlet duct, for ensuring the guiding of the bottles.

References Cited
UNITED STATES PATENTS

| | | | |
|---|---|---|---|
| 395,130 | 12/1888 | Given | 243—11 |
| 570,161 | 10/1896 | Fordyce | 302—2 |
| 1,148,078 | 7/1915 | Cowley | 243—11 |
| 2,890,913 | 6/1959 | Miskel | 193—43 |

EVON C. BLUNK, *Primary Examiner.*

H. C. HORNSBY, *Assistant Examiner.*